Dec. 30, 1958  J. Y. KUMAGAI  2,866,887
POWER DRIVEN MANUALLY HELD WELDING APPARATUS
Filed Feb. 9, 1956
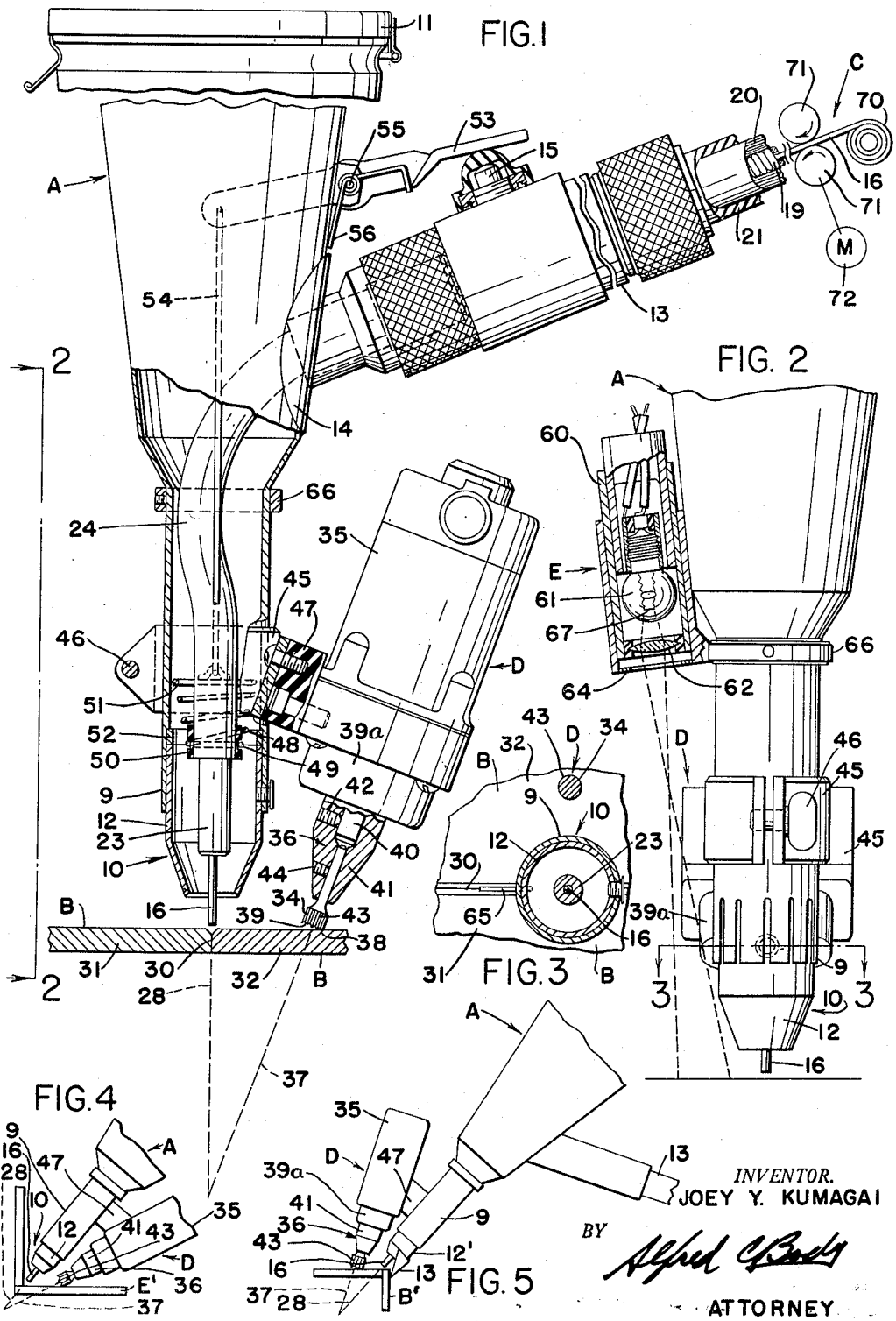
INVENTOR.
JOEY Y. KUMAGAI
BY
Alfred C. Body
ATTORNEY

United States Patent Office 2,866,887
Patented Dec. 30, 1958

2,866,887

POWER DRIVEN MANUALLY HELD WELDING APPARATUS

Joey Y. Kumagai, Willowick, Ohio, assignor to The Lincoln Electric Co., Cleveland, Ohio, a corporation of Ohio Application February 9, 1956, Serial No. 564,482

13 Claims. (Cl. 219—130)

This invention pertains to the art of heating metals for the purpose of welding or cutting and, more particularly to apparatus for this purpose of the manually guided power propelled type.

The invention is particularly applicable to and will be described with particular reference to arc welding apparatus of the type wherein an electrically energized consumable wire electrode is moved both longitudinally toward a workpiece along a manually directed line of movement and simultaneously sidewardly along a desired line of weld to deposit a weld bead. However, the invention is, in most instances, equally applicable to other forms of welding or to metal cutting such as, without limitation, the use of bare or coated electrodes, the so-called non-consumable type electrodes wherein a filler rod may, or may not, be employed, or even gas.

In apparatus of the general type first referred to, the electrode is usually fed from a remotely located electrode reel through a flexible conduit to the welding head, which head also includes means for guiding an arc-shielding medium such as a granular flux or a gas toward the workpiece along the electrode for the purpose of shielding the arc and the molten weld pool from the atmosphere.

Such apparatus has many of the advantages of the usual fully automatic arc welders in that long, continuous weld beads can be laid down at relatively high linear speeds. On the other hand, such apparatus has many of the disadvantages of manually held welding operations in that the welding operator must accurately and uniformly space his welding head from the workpiece, move his welding head along the weld bead at a constant speed and accurately locate the welding head relative to the desired line of the weld bead if good welds are to be obtained. These difficulties are aggravated when granular flux is employed because then the operator cannot observe the molten arc pool and cannot see the weld bead at the point where the weld is taking place.

Various ways have been proposed in the past to both space the welding head from the workpiece and mechanically propel it along the workpiece. Usually and in the simpler forms such ways have taken the form of a motor driven wheel mounted on the welding head and engaging the workpiece during the welding operation.

Apparatus of this general type has been described in co-pending applications, Serial No. 319,907, filed November 12, 1952, and Serial No. 342,192, filed March 13, 1953, both assigned to the assignee of this application. Such apparatus did not come into extensive commercial use because of certain inherent limitations of the type of propelling wheel employed. Thus the wheel had an axis of rotation generally parallel to the surface of the workpiece and had to have supporting bearings and power drive mechanism close to the workpiece where the welding flux, the weld spatter, or the heat of the arc could adversely affect them. Also the bulk of the wheel and the drive mechanism obscured the welding operator's vision and also made welding in crowded spaces extremely difficult, if not impossible.

Because of the bulk of the bearing support and the drive mechanism, it was generally impossible to reduce the size of the driving wheel below 1½ inches. With such a diameter of drive wheel, proper driving contact with the workpiece was found to be difficult particularly when the wheel had to roll over rusty surfaces or through the granular flux which was being deposited as the weld progressed. As a result of the present invention, it has been found that the diameter of this drive wheel is critical and that if it can be made sufficiently small, the arc of contact of the wheel with the workpiece can be so reduced that the flux around the wheel is not a problem.

Another problem with apparatus of the type to which this invention pertains is that of so guiding the welding head that the line of movement of the electrode will always pass through the desired point of weld. If the wheel is placed in advance of the electrode so as to assist the guiding operation, welding into corners is difficult. If the wheel is placed at the side of the electrode, its bulk, as above pointed out, obscures the vision of the welding operator and prevents welding into corners.

Another difficulty with apparatus of the general type to which this invention pertains is the frictional forces developed between the electrode and the flexible conduit. To help overcome these frictional forces, it has been conventional to employ motor-driven, knurled, pinch rolls. However, as the length of the conduit increased, it was found that a point was reached where even such rolls could not develop a sufficient driving force to push the electrode through the conduit.

The present invention contemplates apparatus of the general type described which overcomes all of the above-mentioned difficulties and others, is simple in construction, has a minimum of bulk at the workpiece and is easy to operate.

In the art of arc welding, it is conventional to dispose the electrode symmetrically relative to the surfaces of the workpiece immediately on each side of the desired weld bead; that is to say, the electrode will be in a plane which bisects the two surfaces immediately on each side of the weld bead. The electrode while being held in this plane may then be inclined either in the direction of the weld or away from the direction of the weld, or may be held vertical. As the invention is particularly applicable to consumable electrode welding and such electrode has a longitudinal line of movement, the orientation of the electrode relative to the workpiece will hereinafter be referred to as the line of movement. The same would be true with a gas torch. Obviously, with non-consumable type electrodes there will not be in fact a line of movement but simply an axis or line of orientation of the electrode which corresponds to such line of movement.

Also, the electrode is moved sidewardly along the desired line of weld to deposit molten metal and form the weld bead. Obviously where the electrode, either consumable or non-consumable, is used for the purpose of cutting metal, there will not be in fact a line of weld but simply a line of action which corresponds to such line of weld. The same would also be true wherein a gas torch were employed for the purpose of cutting.

In accordance with the present invention, there is provided apparatus of the general type referred to, comprising in combination: means for performing an act or series of acts on a workpiece and having a line of orientation relative to the workpiece and power driven means for driving the first means sidewardly along a desired line of action including a rotatable member engageable with the workpiece at a point spaced from its axis of rotation and with such axis forming an angle of between 0° to 60° relative to the plane containing both the line of orientation and the line of action.

While it is believed that this range of angles is novel, in most embodiments of the invention the angle will be between 0° and 45° and in preferred embodiments of the invention it has been found that an angle of between 15° and 25° is desirable to handle the maximum number of situations.

Further in accordance with the invention, the rotatable member has an axis of rotation which intersects the line of orientation below a plane perpendicular to such line of orientation at the surface of the workpiece.

Still further in accordance with the invention, the power driven member has supporting bearings spaced from the point of engagement of the member with the workpiece a distance greater than the diameter of the member at the point of engagement and, more specifically, spaced from the point of engagement at least three times the diameter.

Still further in accordance with the invention, the rotatable member has a diameter at the workpiece of between ⅛ and one inch and, more specifically, in accordance with the invention, of between ⅛ and ½ inch.

With apparatus constructed in accordance with the invention, it will be seen that the rotatable member can be in the form of an elongated shaft-like member, one end of which engages the workpiece but with its supporting bearings substantially removed from the workpiece. For certain types of operations, such member will engage the workpiece with its axis extending through the workpiece close to the member and will drive the apparatus along the desired line of action in a manner similar to one moving an upended drum on a floor by tipping it slightly and then rotating it.

Further, it will be noted that as the diameter of the member at the workpiece becomes smaller and smaller, its speed of rotation for a given linear speed along the desired line of action may be proportionately increased. In effect, a speed reducing action is taking place at the workpiece, making it possible to reduce, or eliminate, speed reducing action and the inherent friction thereof between the driving motor and the member. A considerable saving in bulk can thus be accomplished. Furthermore, as the diameter of the member is decreased, a greater unit pressure results between the member and the workpiece resulting in a more positive driving action.

Further in accordance with the invention, there is provided, in combination: a head and a rotatable member engageable with the workpiece at a point spaced from its axis of rotation in such a manner that the member rotates relative to the workpiece on an axis through the point of engagement of the edge of the member with the workpiece as such point of engagement progresses along the workpiece and around the edge of the member, thus giving a grinding action on any particles which might tend to interfere with proper engagement of the member with the workpiece.

Further in accordance with the invention, there is provided a welding head including means for positioning the electrode relative to the workpiece on a line movement, a nozzle generally concentric with the line of movement for guiding an arc-shielding medium toward the workpiece and a motor driven rotatable member mounted on the welding head and having a diameter equal to, or less than, that of the nozzle.

Still further in accordance with the invention, a head is provided comprised of means for positioning an electrode relative to a workpiece, means for propelling the head and thus the electrode sidewardly along the workpiece and a light source adapted to project a beam of light onto the workpiece in advance of the movement of the head so arranged that when the beam strikes the desired line of action, the operator will be assured that the electrode line of orientation intersects the line of action. Preferably in accordance with the invention, this light source projects a beam or beams of light having at least two distinct spaced points, defining a line which when extended passes through the electrode line of movement. Thus the operator has a visual or imaginary line which at all times aids him in locating the electrode relative to the action line but which will not interfere with his guiding the electrode into corners or the like. Such light source may perform the auxiliary function of illuminating the action line, but the prime function is that of assisting in the providing of an imaginary line through the electrode.

Still further in accordance with the invention, there is provided, in combination: a head, a remotely located electrode source, a flexible conduit for guiding the electrode from the source to the head and a pair of electrode drive pinch rolls adjacent to the source for pushing the electrode through the conduit, such rolls having smooth electrode engaging surfaces which will not mar the electrode surface as it passes therethrough. The electrode will thus develop a minimum amount of frictional force with the conduit and greater length of conduit can be employed.

Also, there is provided, in combination: a flux hopper having a flux discharge passage, and a valve in said passage comprised of an axially extensible spiral spring having, when collapsed, adjacent turns spaced closer together than the size of the flux particles to be used, and when axially extended, a spacing to allow the particles to flow therethrough.

The principal object of the invention is the provision of a new and improved apparatus of the type referred to, having power driven means engaging the workpiece for advancing the apparatus along such workpiece, which is simple in construction, has a minimum of bulk at or immediately adjacent to the workpiece, is unaffected by the presence of flux, scale or other irregularities on the surface of the workpiece and enables particularly in manually held arc welding operations the attainment of high quality weld seams by relatively unskilled welding personnel.

Still another object of the invention is the provision of new and improved apparatus of the general type described wherein the supporting bearings for the member engaging the workpiece can be substantially removed from the vicinity of the workpiece.

Another object of the invention is the provision of new and improved power driven means for advancing an electrode along a workpiece including a motor, a speed-reducing gear train and a member engageable with the workpiece of a diameter at the point of engagement with the workpiece to provide a speed reducing function in addition to the gear train.

Still another object of the invention is the provision of a new and improved manually guided apparatus of the type described including a head and a light source so arranged as to enable the operator to accurately guide the head along a desired weld seam.

Another object of the invention is a flux valve which is simple in construction, has no hinged or sliding parts and will not jam or clog.

Still another object of the invention is the provision of a new and improved arrangement for driving a flexible electrode through a long flexible conduit without so marring the surface of the electrode as to increase the frictional forces between the electrode and the surfaces of the conduit.

Another object of the invention is the provision of a new and improved work-engageable power means for propelling a welding head along the workpiece having an arc of contact with the workpiece sufficiently small as to provide a high unit pressure with the workpiece so as to break through scale on the surface of the workpiece or to crush flux in the path of the member.

The invention may take physical form in certain combinations and arrangements of parts a preferred embodiment of which will be described in detail in this application and illustrated in the accompanying drawings which form a part hereof and wherein:

Figure 1 is a side elevational view, partly in section, of electric arc welding apparatus constructed in accordance with the present invention, Figure 2 is a fragmentary view of Figure 1 taken approximately on the line 2—2 thereof, Figure 3 is a cross-sectional view of Figure 2 taken approximately on the line 3—3 thereof, Figure 4 is a side elevational schematic view showing the apparatus of Figure 1 in position to make a fillet weld; and, Figure 5 is a view similar to Figure 4 but showing the welding head in position to make an outside corner weld.

The apparatus shown in the drawings is of a type intended to make what is usually known as a submerged arc weld with bare consumable electrodes. It will be appreciated that the invention is equally applicable to other types of welding including the use of coated electrodes, gas-shielded welds whether using consumable or non-consumable electrodes, and to any desired electrode material such as, without limitation, iron, steel, aluminum, tungsten, carbon or the like. The invention is likewise applicable to cutting or the use of gas.

Referring now to the drawings wherein the showings are for the purposes of illustrating the invention only, and not for the purpose of limiting same, the Figures show arc welding apparatus comprised generally of a welding head A in welding relationship relative to a workpiece B, electrode feed means C for feeding an electrode through the welding head to the workpiece, motor propelled workpiece engaging mechanism D mounted on the head A for both spacing the welding head from the workpiece and driving it sidewardly along the workpiece and a light source E also mounted on the head for projecting a guiding beam of light onto the workpiece in advance of the sideward movement of the welding head A.

The welding head A is comprised generally of a flux hopper 10 in the form of an upwardly opening frustum of a cone having at its upper end a pivoted cover 11 and at its lower end a cylindrical extension 9. A flux nozzle 12 through which granular flux, not shown, may be deposited on the workpiece B as the welding operation progresses is telescoped into the lower end of the extension 9.

The flux hopper 10 and extension 9 may be of any desired material although they are preferably made of sheet metal. The flux nozzle 12 is preferably formed of copper or other material having high heat conductivity. It could be formed of a refractory material if desired. As the nozzle 12 will in the course of time be burned by the heat of the arc, it is preferably made easily replaceable. Also, as will appear, different shaped flux nozzles may want to be employed for different types of welding such as that shown in Figure 5 wherein the flux nozzle 12' has an extension on the side 13 to engage a vertical side of a workpiece B'.

It will be appreciated that if an inert gas is employed for the purpose of shielding the arc, the flux hopper can be dispensed with and the flux nozzle 12 would then become a gas nozzle. If an operation is being performed, where shielding is not required, the flux or gas nozzle may be dispensed with.

The welding head A also includes a hollow handle 13 of any desired construction but preferably of electrically insulated material fastened at one end to the side of the flux hopper 10 by means of a gusset plate 14. Preferably an electric switch 15 for operating the apparatus is mounted on the handle 13 as shown.

An electrode guide 24 extends from the interior of the handle 13 through the flux hopper 10 to a point spaced upwardly from the lower end of the flux nozzle 12 and generally coaxial therewith to form an electrode nozzle 23 through which a flexible wire electrode 16 may be advanced along a line of orientation 28 which in this case is also a line of movement toward the workpiece B to effect a welding operation on a desired line of weld 30 between members 31, 32 making up the workpiece B.

This line of movement 28 corresponds to the longitudinal axis of the electrode 16. If the electrode were of the so-called non-consumable type, it will be understood that its axis would be normally positioned the same as that of a consumable electrode and would thus be identically located with that of the electrode 16 shown. In all cases it will be noted that the electrode axis, or the line of movement, or both, is generally symmetrically located relative to the surfaces of the workpiece immediately on each side of the desired line of weld 30. In the embodiment shown, the line of movement is perpendicular to the workpiece surfaces although its angle could be disposed other than that shown without unduly affecting the welding operation.

The electrode 16 is advanced from the electrode feed means C through a flexible conduit made up of a helical steel core 19, a surrounding sheath of electrically conductive material 20 adapted to carry the electrical welding energy from a power source, not shown, to the electrode guide 24 and a surrounding sheath of electrically insulating material 21. The electrode 16 obviously extends through the handle, the electrode guide 24 and out of the electrode nozzle 23.

While not particularly shown in the drawing, it is to be emphasized that the electrically conductive members 20 and the nozzle 23 are all electrically insulated from the flux hopper 10, and the flux nozzle 12, as is more fully described and claimed in Patent No. 2,666,832, dated January 19, 1954, and assigned to the assignee of this application. Also the lower end of the electrode nozzle 23 terminates above the lower end of the flux nozzle 12 so that if the electrode 16 is retracted into the nozzle 23, there will be no exposed surfaces which are electrically energized relative to the workpiece B.

As indicated above, the electrode 16 is advanced from the electrode nozzle 23 along a line of movement 28 which, as shown in Figure 1, is perpendicular to the surfaces of the workpiece B. Obviously this line of movement 28 relative to the workpiece B may be manually controlled as desired. Such variations for different welding situations are more clearly shown in Figures 4 and 5.

In Figure 1 the line of action or weld 30 is perpendicular to the surface of the drawing and these two lines define a plane to which reference will be subsequently made. This plane is manually adjustable relative to the workpiece B.

The workpiece engaging propelling means D is mounted on the side of the welding head A and includes a rotatable member 36 driven by an electric motor 35 through a gear train, not shown.

The rotatable member 36 has an axis of rotation 37 and an end 39 symmetrical about the axis. Generally, but not necessarily, the end 39 is perpendicular to the axis. The sides 34 of the member 36 adjacent to the end 39 are also symmetrical about the axis 37 and intersect the surface of the end 39 to form a corner 38. This corner should be sharp so that a high unit pressure results against the workpiece.

Alternatively and preferably, the lower end of the member 36 is knurled as shown to provide a series of slightly spaced contact points between the member 36 and the workpiece B. It has been found that with the knurling the points thereof tend to dig into the surface of the workpiece B to give a positive and firm driving action. In the event knurling is employed, it is preferred that the teeth thereof be spaced sufficiently far apart and that the root depth be sufficiently great so as to provide a clearance for any flux particles which are not swept away and are thus ground up between the corner 38 and the upper surface of the workpiece B.

With knurling, the end 39 rotates around the point of contact of successive teeth with the workpiece, thus helping each tooth to bite in and secure a better driving contact. This rotational action also helps to grind up any flux particles which are not swept from the path of forward movement and are trapped under the end 39.

Preferably, the lower end of the member 36 is made of a hard abrasive and heat resistant material such as hardened steel, ceramics, sintered carbides or the like. It will be appreciated, however, that rubber can be employed for the purpose of assisting in the frictional engagement of the member 36 with the workpiece B, or the end can be left smooth, as desired.

In operation the driving means D are always held so that the axis 37 is at an angle other than perpendicular to the surface of the workpiece B such that the member engages the workpiece at a point spaced from the axis.

Thus, as the member 36 rotates, it moves along the workpiece B with a direction of movement perpendicular to the plane containing the axis and the radial line through the point of contact. The direction of movement may be shifted by properly moving the axis so that it leans in a direction perpendicular to the desired direction of movement.

It will be noted that in Figure 1 at the exact point of contact between the corner 38 and the surface of the workpiece B, the member 36 is rotating relative to the workpiece about this point of contact. The effect is to produce a grinding action on any surface irregularities or on granular flux particles which might be in the path of the member 36 so that a firm contact is always had with the surface of the workpiece B. Also, this action causes the corner to dig into the workpiece surface. Furthermore, the rotation of the member 36 tends to sweep away any of the flux particles in the path of forward movement. Metal to metal contact between the member 36 and the workpiece is thus facilitated.

It will be noted that in all cases, to provide a driving action, the axis 37 must be at an angle other than perpendicular to the surface of the workpiece B at the point of engagement. Such angle may be anything down to, and including, 0°; that is, the axis 37 is then parallel with the surface of the workpiece B. In such case, the end of the member 36 serves in effect as a wheel. Its small diameter, however, provides good driving contact with the workpiece.

In accordance with the invention, the axis 37 forms an angle with the plane containing the electrode line of orientation and the line of action or weld of between 0° and 60° and, further but not necessarily, converges on this plane below the surface of the workpiece.

Within the angular limits stated, the electrode line of movement 28 relative to the surface of the workpiece B may be as desired, so long as it does not equal exactly the angle between the axis 37 and the plane containing the line of movement and the desired line of weld.

In the embodiment of the invention shown, the supporting bearing 39a for the member 36 is located in the lower end of the housing enclosing the motor 35 and, as will be seen, this bearing 39 is spaced a substantial distance from the workpiece and from the lower end of the flux nozzle 12. It is thus clear of the dirt from the weld such as the weld spatter, the flux, or the heat from the weld. In particular, the invention contemplates a rotatable member having its supporting bearing spaced above the lower end of the flux nozzle at all times. Obviously, the bearing 39a may be either higher than or lower than that indicated.

In particular, the bearing is always spaced from the workpiece-member point of contact a distance greater than the diameter of the member at the point of contact and preferably at least three times greater.

The diameter of the lower end of the member 36 is intentionally held quite small, inasmuch as there is no need to make the diameter large enough to provide clearance for supporting bearings or other drive mechanism and a more positive driving action results.

Also, for a given rotational speed of the member 36, the linear movement of the apparatus along the workpiece B is determined by the radial distance between the axis 37 and the point of engagement with the workpiece B. Because this radial distance may be made as small as desired, the shaft 36 may have relatively high rotational speeds. In some instances, the motor 35 may be direct coupled to the shaft 36 although it is preferred that a small gear train be provided. In any event, the small radial spacing of the point of engagement, in effect, provides a speed reducing action. Such speed reducing action appears to become more important as the diameter of the lower end of the member 36 is below one inch and, more particularly one-half inch. It is believed that I am the first one to have ever employed such a small diameter driving member. A further advantage of such a small diameter is that the member 36 does not obscure the vision of the welding operator, nor does the member 36 interfere with the welding operator welding into corners or in close quarters.

The supporting bearing 39a has an output shaft 40 over which an adaptor shaft 41 slides and is removable, held in position by a set screw 42. Obviously, the adaptor shaft 41 can be of any desired length. A shaft having a knurled end 43 slides into the lower end of the shaft 41 and is releasably held in position by a set screw 44. Thus, as the end 43 wears, it may be readily replaced, or if a different diameter of driving member is desired, it may be readily substituted.

It will be appreciated that other constructions and arrangements can be readily substituted at this point.

The drive mechanism D may be mounted on the welding head A in any desired manner but is preferably mounted in an adjustable manner so that the welding operator has a maximum degree of flexibility in the operation of the apparatus.

In the embodiment of the invention shown, a split collar 45 is slidable along, and rotatable about, the cylindrical extension 9 and can be fixed in any adjusted position by tightening the thumb screw 46. The motor housing 35 is fastened to a block of insulating material 47, in turn mounted on the split collar 45.

With the arrangement just described, the spacing of the lower end of the flux nozzle 12 and/or the electrode nozzle 23 from the workpiece B can be readily controlled. By raising or lowering the end of the flux nozzle relative to the workpiece, the amount of flux deposited can be increased or decreased respectively. Further, by raising or lowering the end of the electrode nozzle relative to the workpiece, the stickout distance of the electrode can be controlled and thus the meltoff rate for a given welding current, all as described in United States Patent No. 2,721,249 dated October 18, 1955, and assigned to the assignee of this application.

In the embodiment shown, the axis of rotation 37 intersects with the line of movement 28 below the workpiece B. It is, of course, possible to so orient the axis 37 relative to the welding head A that the axis 37 is displaced from the line of movement 28 in the direction of the line of action and instead intersects the plane containing the line of movement or orientation and the line of action.

Considerable experimentation has indicated that for the maximum number of welding operations, the angle between the axis 37 and the plane containing the line of orientation and the line of action should be 20°. It is not believed that the invention is limited to this exact angle but that a more practical limitation is an angle of between 10° and 30° although angles of between 0° to 45° or even 0° to 60° could possibly be employed successfully while employing the teachings of the invention.

With the embodiment shown, it is additionally possible to locate the member 36 in any desired radial position about the flux hopper 10 in relation to the handle 13. In some cases this is desirable where it is desired to weld an outside corner such as is shown in Figure 5.

The mounting arrangement for the drive mechanism D may be other than that shown and may be adjustable or not, as desired. It will be appreciated that the spacing of the lower end of the flux nozzle 12 and the workpiece B can also be controlled by the length of the member 36 which can be made telescoping into the motor 35 or can be made in several pieces which telescope one piece into the other.

It will be noted from Figure 3 that the member 36 engages the workpiece B on the perpendicular line from the electrode line of movement 28 to the plane containing this line of movement and the line of weld. Obviously, the member 36 can engage the workpiece at any desired position relative to the electrode line of movement so long as the angular relationships above defined are maintained.

With the arrangement shown, the position of the member 36 is such as to assist in advising the welding operator of the exact position of the electrode line of movement which is generally obscured to his view.

A flux valve arrangement is shown mounted in the cylindrical extension 9 comprised of an axially extensible spiral spring 48 shown in the axially extended position. This spring, when axially collapsed, is so arranged that the adjacent turns will be spaced closer together than the size of the flux particles to be used in the welding. The smaller end of the spring 48 has a circular portion 49 mounted in a groove of a cylindrical bushing 50 of electrically insulating material mounted on the lower end of the member 24. The larger, or outer, portion of the spring 48 is also generally circular and has a diameter just slightly less than the inner diameter of the cylindrical extension 9. When the spring 48 is axially collapsed, this circular portion 51 rests on an upwardly facing shoulder of a flux valve seat 52 mounted on the interior side of the cylindrical extension 9.

For the purpose of extending and collapsing the spring 48 a lever 53 is provided pivotally mounted on the side of the flux hopper 10 and extending into the interior thereof. A control linkage 54 connects the upper end portion 51 of the spring 48 with the lever 53. The lever 53 is pivoted at 55 and is biased in a counter-clockwise direction by a spring member 56. It will be noted that the right-hand end of the lever 53 extends over the control button of the switch 15. Thus, when it is desired to operate the apparatus, the lever 53 is rotated in a clockwise direction which first opens the flux valve and then depresses the button 15. This button actuates the electrical circuits to start the welding operation going, including the drive motor 35.

The guiding light source E is so arranged as to project a spot, or spots, of light onto the workpiece on the desired line of action so as to assist the operator in guiding the head. In some instances, a single relatively small spot on the desired line of action will meet such requirement. Preferably, however, the beam on the workpiece defines a line, either real or imaginary, on the line of action which line, if extended, will pass through the electrode line of orientation at the surface of the workpiece.

In the embodiment of the invention shown, the light source E is comprised of an electric light bulb 61 positioned in a cylindrical housing 60 in turn mounted on the upper end of the cylindrical extension 9 by means of a collar 66; a focusing lens 62 is mounted in the lower end of the housing 60 and focuses the filament 67 onto the workpiece to define a thin, narrow line 65 of light on the line of action 30 as is shown in Figure 3. The filament 67 is either a small diameter helix or a single strand of wire with its longitudinal dimensions so oriented that the line 65 is disposed as is shown in Figure 3. A mask 64 is located between the lens 62 and the lower end of the housing 60 to block out any extraneous light.

Obviously, the line 65 could instead be two points of light or, instead, could be a large spot of light having two readily recognizable ears or lobes disposed on the desired line of action. The arrangement shown is simple and is preferred.

The electrode 16 is fed to the welding head A from an electrode reel 70. A pair of electrode pinch rolls 71 driven by an electric motor shown schematically at 72, are employed to push the electrode 16 through the helical steel core 19 to the welding head A. In accordance with the invention, these rolls 71 have a smooth electrode engaging surface as contra-distinguished from previous practice wherein the surfaces were knurled or otherwise roughened so as to dig into the surface of the electrode 16 and give a firm driving action. The rolls may have a peripheral groove to receive the electrode if desired.

As pointed heretofore, the electrode surface became roughened and this actually increased the frictional forces between electrode 16 and the helical conduit 19. These frictional forces on long conduits increased at a rate faster than the driving forces developed by the knurling action. Thus, as the conduit 19 was lengthened, at a point it became impossible to drive the electrode through it. By the employment of smooth surfaced driving rolls, it has been found that the electrode can be driven through much greater lengths of flexible conduit without the danger of having the electrode bind in the conduit with the resultant stoppage of the welding operation.

The rolls 71 may have any desired cross-sectional configuration so long as the surface which engages the electrode 16 is smooth and does not mar the surface of the electrode.

In operation, the apparatus is positioned on the work with the end of the member 36 engaging the upper surface of the workpiece B and the line of orientation 28 over the point where the welding operation is to commence.

Preferably, the electrode 16 is withdrawn into the electrode nozzle 23. A spring 48 is in the generally flat position, closing off and preventing the flow of flux out of the hopper 10.

To start the apparatus in operation, the lever 53 is depressed which first axially extends the spring 48 to allow flux to flow through the flux nozzle 12 and then subsequently depresses the switch 15 to close electrical contacts not shown, which electrically energize the motor 72 and the motor 35. Energization of the motor 72 drives the electrode along the line of movement 28 toward the workpiece B. The member 36 is rotated and as it commences to rotate, the apparatus is moved along the desired line of action, the operator using the light line 65 to guide the movement. By properly tilting the axis of rotation 37, the apparatus may be guided in any desired direction on the surface of the workpiece B. At all times the line 65 indicates the exact line of movement.

When it is desired to stop the welding operation, the operator releases the lever 53 which closes the flux valve and opens the switch 15. Preferably, the opening of the switch 15 completes a circuit which will cause the motor 72 to be reversed for a brief moment so as to withdraw the electrode 16 into the electrode nozzle 23. Such arrangement is more clearly disclosed in U. S. application No. 342,192, filed March 13, 1953, and owned by the assignee of this application. The automatic operation of the flux valve by movement of the electrode may also be employed as disclosed in U. S. application Serial No. 370,896, filed July 16, 1953.

The preferred embodiment of the welding apparatus just described has proven to be extremely practicable and easy to use in commercial use. The drive mechanism gives a firm driving contact with the workpiece which does not have a tendency to slip and which is easily guidable along the workpiece by the welding operator. The light source defining an imaginary line through the electrode aids the operator in always knowing where his electrode is and in keeping it properly oriented on the desired line of weld.

Further, the location of the rotatable member 36 relative to the electrode and the light line 65 further assists in this alignment.

Also, the extremely small bulk of driving mechanism close to the work interferes with the operation of the welding head to a minimum and does not, in any way, obscure the operator's vision.

Thus, it will be seen that an embodiment of the invention has been described which accomplishes all the objectives heretofore set forth and others, and provides welding apparatus which is extremely easy to use.

Obviously, modifications and alterations of the above-described embodiment will occur to others upon a reading and understanding of this specification and it is my intention to include all such modifications and alterations insofar as they come within the scope of the appended claims.

Having thus described my invention, I claim:

1. Electric arc apparatus comprising, in combination: a head including an electrode nozzle for guiding an electrode toward a workpiece on a manually controllable line of movement, and means engageable with said workpiece, and, spacing said electrode nozzle from said workpiece and for moving the nozzle sidewardly along a desired line of action, the improvement which comprises said means including a single motor-driven work-engaging rotatable member having an axis of rotation disposed at an angle of between 0° and 60° relative to the plane containing the line of movement and the line of action.

2. The combination of claim 1 wherein said angle is between 0° and 45°.

3. The combination of claim 1 wherein said angle is between 10° and 30°.

4. The combination of claim 1 wherein said means are adjustably mounted relative to said nozzle parallel to and/or around said line of movement.

5. Apparatus for cutting or welding workpieces comprising, in combination: a head and power driven means for spacing the head from a workpiece and driving it along the workpiece including a single work engageable rotatable member having an axis of rotation operable at an angle relative to the surface of the workpiece of between 45° to 88° to drive said head along said workpiece.

6. Apparatus of the general type described comprising, in combination: means for positioning an electrode relative to a workpiece, a rotatable, elongated, power-driven shaft having an end adapted to engage the workpiece and drive the apparatus along the workpiece and bearing means for supporting said shaft the closest portion of which is spaced from said end a distance greater than the diameter of said end.

7. Apparatus of the general type described comprising, in combination: means for positioning an electrode relative to a workpiece, a rotatable, elongated power driven shaft having an end adapted to engage the workpiece and drive the apparatus along the workpiece and a supporting bearing for said shaft the closest portion of which is spaced from the workpiece at least three times the diameter of said shaft at said end.

8. Electric apparatus of the general type described comprising, in combination: a manually guided head having an electrode adapted to be moved along a desired line of action relative to a workpiece and means for projecting a sharply defined line of light onto the workpiece on the projected line of action.

9. Electric arc apparatus comprising, in combination: a head including means for positioning an electrode relative to a workpiece and movable along a workpiece on a guidable line of action, and means for projecting a beam of light onto the workpiece having at least two distinct spaced portions brighter than other portions and so aligned that a projected imaginary line through the portions spaced will pass through the electrode.

10. Electric arc apparatus comprising, in combination: means for positioning an electrode relative to a workpiece on a line of orientation, means for propelling the electrode sidewardly along a desired line of action and a light source so arranged as to project a distinct and readily apparent narrow line of light onto the workpiece such that the line of light, if extended, will pass through the electrode line of orientation on the line of action.

11. Apparatus of the general type described comprising, in combination: a head including means having a manually controllable line of orientation and adapted to act on a workpiece on a desired line of action, and power driven means for moving said means along said desired line of action, including a single rotatable member having an axis of rotation disposed at an angle of between 0° and 60° to the plane containing the line of orientation and the line of action and engaging said workpiece at the end thereof to space and drive said head along the workpiece.

12. The combination of claim 11 wherein said angle is between 10° and 30°.

13. Electric arc welding apparatus comprising, in combination: a flux hopper having an opening at the lower end through which flux is adapted to be discharged onto a workpiece and a flux valve in said hopper comprising a valve seat and a valve member, said valve member being comprised of an axially extensible spiral member having, when collapsed, adjacent turns spaced closer together than the size of the flux particles to be employed in the hopper and, when axially extended, a spacing sufficient to allow the flux particles to flow therethrough.

References Cited in the file of this patent

UNITED STATES PATENTS

| | | |
|---|---|---|
| 337,431 | Pintsch | Mar. 9, 1886 |
| 1,246,355 | Thomas | Nov. 13, 1917 |
| 1,872,114 | Burnish | Aug. 16, 1932 |
| 1,978,042 | Dodge | Oct. 23, 1934 |
| 2,030,689 | Dorrat | Feb. 11, 1936 |
| 2,046,999 | Bredtschneider | July 7, 1936 |
| 2,068,166 | Dodge | Jan. 19, 1937 |
| 2,432,495 | Baird | Dec. 16, 1947 |
| 2,441,507 | Peters | May 11, 1948 |
| 2,692,325 | Stretton | Oct. 19, 1954 |

FOREIGN PATENTS

| | | |
|---|---|---|
| 884,096 | France | Apr. 12, 1943 |